(12) United States Patent
Yoo

(10) Patent No.: US 12,355,759 B2
(45) Date of Patent: Jul. 8, 2025

(54) USER AUTHENTICATION METHOD USING AUTHENTICATION VIRTUAL CODE AND SYSTEM THEREFOR

(71) Applicant: SSENSTONE INC., Seoul (KR)

(72) Inventor: Chang Hun Yoo, Seoul (KR)

(73) Assignee: SSENSTONE INC., Seoul (KR)

( * ) Notice: Subject to any disclaimer, the term of this patent is extended or adjusted under 35 U.S.C. 154(b) by 289 days.

(21) Appl. No.: 17/681,218

(22) Filed: Feb. 25, 2022

(65) Prior Publication Data

US 2022/0182376 A1 Jun. 9, 2022

Related U.S. Application Data

(63) Continuation of application No. PCT/KR2020/011273, filed on Aug. 24, 2020.

(30) Foreign Application Priority Data

| Aug. 30, 2019 | (KR) | 10-2019-0107065 |
| Jul. 22, 2020 | (KR) | 10-2020-0090765 |

(51) Int. Cl.
*H04L 9/40* (2022.01)

(52) U.S. Cl.
CPC ................ *H04L 63/0838* (2013.01)

(58) Field of Classification Search
CPC ... H04L 63/0838; H04L 9/3226; G06F 21/31; G06Q 20/385; G06Q 20/40; G06Q 20/405
See application file for complete search history.

(56) References Cited

U.S. PATENT DOCUMENTS

| 8,451,276 B2 * | 5/2013 | Jung .................. G06T 13/00 345/473 |
| 2004/0111477 A1 * | 6/2004 | Boss .................. H04W 4/029 709/206 |

(Continued)

FOREIGN PATENT DOCUMENTS

| EP | 1388796 A1 | 2/2004 |
| JP | 2007-164337 A | 6/2007 |

(Continued)

OTHER PUBLICATIONS

International Search Report issued in PCT/KR2020/011273; mailed Jul. 14, 2021.

(Continued)

*Primary Examiner* — Abu S Sholeman
(74) *Attorney, Agent, or Firm* — Studebaker Brackett PLLC

(57) ABSTRACT

Disclosed is a user authentication method and system using an authentication virtual code including receiving, by a virtual code verifying means, the authentication virtual code, the authentication virtual code being generated by an authentication virtual code generating function included in a virtual code generating means registered in the virtual code verifying means, searching, by the virtual code verifying means, for a storage location of user identification (UID) or sub-identification (SID) based on the authentication virtual code, extracting, by the virtual code verifying means, authority information stored after matching the found UID or SID, verifying, by the virtual code verifying means, the authentication virtual code based on a time point at which the authentication virtual code is received, and performing, by the virtual code verifying means, user authentication based on the extracted authority information.

13 Claims, 9 Drawing Sheets

Receiving, by virtual code verifying device, authentication virtual code (S100)

Searching, by virtual code verifying device, for storage location of UID or SID based on authentication virtual code (S200)

Extracting, by virtual code verifying device, authority information stored after matching found UID or SID (S300)

Verifying, by virtual code verifying device, authentication virtual code based on time point at which authentication virtual code is received (S400)

Performing, by virtual code verifying device, user authentication based on extracted authority information (S500)

(56) References Cited

U.S. PATENT DOCUMENTS

| | | | |
|---|---|---|---|
| 2009/0177717 A1* | 7/2009 | Meehan | A63F 13/12 |
| | | | 726/28 |
| 2009/0206161 A1* | 8/2009 | Olmstead | G06K 7/10861 |
| | | | 235/462.41 |
| 2012/0245897 A1* | 9/2012 | Bose | G06F 11/3089 |
| | | | 702/186 |
| 2015/0235487 A1* | 8/2015 | Proefke | G07C 9/20 |
| | | | 340/5.61 |
| 2016/0127342 A1* | 5/2016 | Weerasuriya | H04L 67/12 |
| | | | 726/7 |
| 2017/0201797 A1* | 7/2017 | Kwon | H04N 21/2668 |
| 2020/0051065 A1 | 2/2020 | Yoo | |
| 2020/0051070 A1 | 2/2020 | Yoo | |
| 2020/0133215 A1 | 4/2020 | Yoo | |
| 2020/0134610 A1 | 4/2020 | Yoo | |
| 2020/0202329 A1 | 6/2020 | Yoo | |
| 2022/0138727 A1 | 5/2022 | Yoo | |
| 2022/0309487 A1 | 9/2022 | Yoo | |
| 2022/0318787 A1 | 10/2022 | Yoo | |

FOREIGN PATENT DOCUMENTS

| | | |
|---|---|---|
| KR | 10-1316466 B1 | 10/2013 |
| KR | 10-2014-0127987 A | 11/2014 |
| KR | 10-1675927 B1 | 11/2016 |
| KR | 10-2018-0125729 A | 11/2018 |
| KR | 10-2019-0016884 A | 2/2019 |
| KR | 10-2019-0055039 A | 5/2019 |
| KR | 10-2005554 B1 | 7/2019 |

OTHER PUBLICATIONS

The extended European search report issued by the European Patent Office on Aug. 4, 2023, which corresponds to European Patent Application No. 20858791.5-1218 and is related to U.S. Appl. No. 17/681,218.

An Office Action; "Notice of Reasons for Refusal," mailed by the Japanese Patent Office on May 16, 2023, which corresponds to Japanese Patent Application No. 2022-513561 and is related to U.S. Appl. No. 17/681,218.

* cited by examiner

USER AUTHENTICATION METHOD USING AUTHENTICATION VIRTUAL CODE AND SYSTEM THEREFOR

CROSS-REFERENCE TO RELATED APPLICATIONS

The present application is a continuation of International Patent Application No. PCT/KR2020/011273, filed on Aug. 24, 2020, which is based upon and claims the benefit of priority to Korean Patent Application Nos. 10-2019-0107065 filed on Aug. 30, 2019 and 10-2020-0090765 filed on Jul. 22, 2020. The disclosures of the above-listed applications are hereby incorporated by reference herein in their entirety.

BACKGROUND

Embodiments of the inventive concept described herein relate to an untact user authentication method and device using an authentication virtual code.

One time password (OTP) refers to a user authentication method that uses an OTP of a random number thus randomly generated. An OTP authentication method may be used in a system introduced to strengthen security. Because the OTP authentication method generates OTP to perform user authentication whenever a user logs in, security weak points caused by the repeated use of the same password may be overcome.

A user enters a password when a user logs in. At this time, a conventional OTP authentication method identifies who the user is, generates the OTP by using an OTP function assigned to the corresponding user, completes OTP authentication through the generated OTP. Accordingly, the user needs to log in whenever OTP authentication is performed.

As such, it is necessary to perform user authentication by generating OTP without login whenever a user requests authentication. Moreover, as a need to handle untact businesses increases in various fields, there is a need to grant user authentication authority to others in an untact manner. At this time, the user authentication authority granted to others need to be temporary, and needs to be limitedly granted to only the person designated by the user.

There is a prior art disclosed as Korean Registered Patent No. 10-1316466 on Oct. 1, 2013.

SUMMARY

Embodiments of the inventive concept provide a user authentication method and system using an authentication virtual code that allows a user to temporarily grant user authentication authority to another person in an untact manner.

Furthermore, embodiments of the inventive concept provide a user authentication method and system using an authentication virtual code that allows a user to set an authority limit for each purpose or to set a time to grant authority, when the user grants user authentication authority to others.

Moreover, embodiments of the inventive concept provide a user authentication method and system using an authentication virtual code that may provide an authentication virtual code that is newly generated at a unit count interval while not being generated redundantly, whenever user authentication is requested.

Problems to be solved by the inventive concept are not limited to the problems mentioned above, and other problems not mentioned will be clearly understood by those skilled in the art from the following description.

According to an embodiment, a user authentication method by using an authentication virtual code includes receiving, by a virtual code verifying means, the authentication virtual code, the authentication virtual code being generated by an authentication virtual code generating function included in a virtual code generating means registered in the virtual code verifying means, searching, by the virtual code verifying means, for a storage location of user identification (UID) or sub-identification (SID) based on the authentication virtual code, extracting, by the virtual code verifying means, authority information stored after matching the found UID or SID, verifying, by the virtual code verifying means, the authentication virtual code based on a time point at which the authentication virtual code is received, and performing, by the virtual code verifying means, user authentication based on the extracted authority information.

According to an embodiment, a user authentication program by using an authentication virtual code that is stored in a medium in combination with a computer, which is hardware, to perform a user authentication method by using the authentication virtual code.

According to an embodiment, an authentication virtual code generating device for user authentication includes a detailed code generating unit that generates one or more detailed codes based on UID or SID registered in the virtual code generating device, a virtual code generating unit that generates an authentication virtual code obtained by combining the one or more detailed codes, by using an authentication virtual code generating function, and an authentication virtual code providing unit that transmits the generated authentication virtual code to a virtual code receiving device so as to perform the user authentication on a virtual code verifying device through a virtual code receiving means.

According to an embodiment, an authentication virtual code verifying device for user authentication includes a virtual code receiving unit that receives an authentication virtual code, a detailed code extracting unit that extracts a detailed code from the authentication virtual code, a storage location search unit that searches for a storage location of UID or SID based on the detailed code, an authority information extracting unit that extracts authority information stored after matching the found UID or SID, a virtual code verifying unit that verifies the authentication virtual code based on a time point at which the authentication virtual code is received, and a user authentication approving unit that performs the user authentication based on the extracted authority information.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
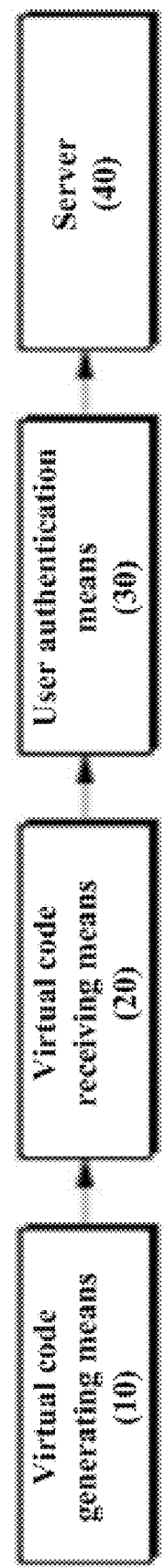
FIG. 1 is a block diagram of a user authentication system by using an authentication virtual code, according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

In this specification, 'user authentication' refers to a procedure for authorizing a user to pass through an area requiring security, such as access, login, or financial transactions, or to perform a function of a specific object In this specification, a 'financial transaction' refers to a procedure that made with a financial company. The 'financial transaction' includes card payments, deposits or withdrawals from a bank account, or the like.

In this specification, a 'character' is a component constituting a code and includes all or at least one of uppercase alphabet characters, lowercase alphabet characters, numerals, and special characters.

In this specification, a 'code' refers to a string of characters.

In this specification, an 'authentication virtual code' refers to a code generated by an authentication virtual code generating means, and means a code used to perform user authentication in an authentication virtual code verifying means. That is, an 'authentication virtual code' refers to a virtual cord temporarily assigned for each unit count to extract and verify the user information.

In this specification, a 'detailed code' refers to a part of codes included in the authentication virtual code.

In this specification, the 'unit count' refers to a unit that is set to a specific time interval and defined to be changed as a time interval elapses. For example, 1 count may be used after being set to a specific time interval (e.g., 1.5 seconds).

In this specification, an 'authentication virtual code generating function' refers to a function used to generate an authentication virtual code.

In this specification, a 'rolling movement' means that an object performs both rotational and translational movements. That is, the 'rolling movement' means moving while performing both rotational and translational movements, and means that each point of an object rotating moves in contact with a moving axis sequentially.

In this specification, 'access authority' is an authority granted through user authentication. When the 'access authority' to a specific object is granted to a user, the 'access authority' is in a state where the user is capable of employing a physical function included in a specific object. As the 'access authority' is granted, an available physical function may vary depending on the type of an object. The type of access authority will be described later.

In this specification, "user identification (UID)" refers to a unique code-type value assigned without redundancy for each user to identify a user.

In this specification, 'sub-identification (SID)' refers to a unique code-type value assigned without redundancy for each authority grantee to identify a target having the granted access authority.

In this specification, a 'storage location' refers to a point (count) on a track corresponding to a point in time when the registration of UID or SID is requested by a user.

In this specification, 'authority information' is stored after matching a storage location of UID or SID and refers to information for defining accessible time, the type of access authority, or the like.

Hereinafter, an embodiment of the inventive concept will be described in detail with reference to the accompanying drawings.

FIG. 1 is a block diagram of a user authentication system by using an authentication virtual code, according to an embodiment of the inventive concept.

As shown in FIG. 1, a user authentication system includes a virtual code generating means 10, a virtual code receiving means 20, a user authentication means 30, and a server 40.

The virtual code generating means 10 refers to a device, in which a dedicated program or dedicated application (hereinafter, referred to as a "dedicated program") for generating the authentication virtual code is built or installed. In more detail, the virtual code generating means 10 may be a terminal of a user that grants access authority to the user authentication means 30 to another person. The virtual code generating means 10 may transmit an authentication virtual code granted with temporary and/or limited access authority to another device.

In an embodiment, the virtual code generating means 10 may be initially registered in the user authentication means 30 or the server 40, which will be described later. A method for initially registering the virtual code generating means 10 will be described later.

Furthermore, in an embodiment, the dedicated program generates the authentication virtual code for user authentication by using UID or SID. Here, the UID or SID may be information stored in both the virtual code generating means 10 and the server 40. The UID or SID may be matched with authority information and stored in the storage location of the UID or SID.

Meanwhile, the UID or SID is not necessarily stored in a memory embedded in the virtual code generating means 10. For example, the UID or SID may be stored in a card or wearable device that performs separate wireless communication. The user allows a terminal, in which the UID or SID is stored, to transmit the UID or SID to the virtual code generating means 10 such that the virtual code generating means 10 generates an authentication virtual code.

In the meantime, the dedicated program generates the authentication virtual code by using UID or SID, by including an authentication virtual code generating function. For example, the dedicated program generates the authentication virtual code by using the UID or SID as seed data of the authentication virtual code generating function. However, an embodiment is not limited thereto. For example, the dedicated program may generate the authentication virtual code by using a unique value of a virtual code generating means or a unique value of a virtual code verifying means as seed data. In this specification, the UID or SID to be described may be replaced with the unique value of the virtual code generating means or the unique value of the virtual code verifying means. In an embodiment, the dedicated program may generate the authentication virtual code by using a serial number of a vehicle, a door lock, or a terminal as seed data.

When the authentication virtual code is generated by using the unique value of the virtual code verifying means as seed data, the user authentication may be performed without registering the virtual code generating means in the virtual code verifying means. This will be described later.

Furthermore, in an embodiment, the dedicated program registers the virtual code generating means 10 in the user authentication means 30 or the server 40. That is, a user installs the dedicated program in the virtual code generating means 10 (that is, a user terminal). The dedicated program transmits the UID or SID to the user authentication means 30 or the server 40 so as to be registered therein. However, an embodiment is not limited thereto. For example, the dedicated program may be a program installed in the virtual code generating means 10 when being released from a factory.

As a specific example, the dedicated program receives UID or SID entered from the user at the time of registration or generates user information based on the user's login information of the dedicated program. After that, the dedicated program transmits the user information to the user authentication means 30 or the server 40. As the user authentication means 30 or the server 40 registers the UID or SID at a specific count, the dedicated program receives an authentication virtual code generating function or setting data for specifying the authentication virtual code generating function from the user authentication means 30 or the server 40. In this way, the dedicated program may include an authentication virtual code generating function for generating an authentication virtual code capable of searching for a specific count at which user information is registered in the user authentication means 30 or the server 40.

In the meantime, in another embodiment, the dedicated program may register the UID to the user authentication means 30 or the server 40 and then may additionally register the SID to the user authentication means 30 or the server 40. The dedicated program may allow the SID, which is additionally entered, to be stored after matching a storage location of a pre-registered UID or to be stored separately from the UID. As the user authentication means 30 or the server 40 registers the SID at a specific count, the dedicated program receives an authentication virtual code generating function or setting data for specifying the authentication virtual code generating function from the user authentication means 30 or the server 40. Here, the authentication virtual code generating function or the setting data for specifying the authentication virtual code generating function may be different from that received from the user authentication means 30 or the server 40 when the UID is registered. Afterward, by using the dedicated program, a user may select whether to generate an authentication virtual code based on UID or whether to generate an authentication virtual code based on SID.

In an embodiment, when the generation of an authentication virtual code is requested, the virtual code generating means 10 may generate the authentication virtual code by using different authentication virtual code generating functions depending on the type of ID selected by a user. However, an embodiment is not limited thereto. For example, when the generation of an authentication virtual code is requested, the virtual code generating means 10 may use the same authentication virtual code generating function regardless of the type of ID selected by the user and may use the ID selected by the user as seed data. The virtual code receiving means 20 receives the authentication virtual code generated by the virtual code generating means 10, and displays the received authentication virtual code on a display unit included in the virtual code receiving means 20, or transmits the authentication virtual code to the server 40 through a communication unit included in the virtual code receiving means 20.

In an embodiment, the virtual code generating means 10 may deliver a text message including the authentication virtual code to the virtual code receiving means 20. A user of the virtual code generating means 10 may transmit a text message to the virtual code receiving means 20 at a time zone at which access authority is granted to a user of the virtual code receiving means 20.

In another embodiment, the user of the virtual code generating means 10 may deliver the text message to the virtual code receiving means 20 through short-range communication (e.g., NFC communication). In this case, the user of the virtual code generating means 10 may deliver an authentication virtual code through contact with the virtual code receiving means 20.

The communication unit included in the virtual code receiving means 20 transmits and receives an authentication virtual code by communicating with the virtual code generating means 10 and the server 40. Herein, in addition to near field communication (NFC), Bluetooth, Bluetooth Low Energy (BLE), beacon, radio frequency identification (RFID), infrared data association (IrDA), ultra wideband (UWB), ZigBee, or the like may be used as the wireless communication scheme of the communication unit.

For example, the communication unit may be an NFC communication unit (e.g., an NFC antenna) connected to an IC chip. For example, a user of the virtual code receiving means 20 may transmit the received authentication virtual code to the user authentication means 30 by tagging the user authentication means 30.

As another example, the virtual code receiving means 20 receives the authentication virtual code (e.g., reception through a text message) and displays the received authentication virtual code on the display unit included in the virtual code receiving means 20. The user of the virtual code receiving means 20 may perform user authentication by entering the authentication virtual code displayed on the display unit into the user authentication means 30.

The user authentication means 30 is a target an object for which a user of the virtual code generating means 10 grants user authentication authority to another person. The other person who has received the authentication virtual code may obtain access authority to the user authentication means 30 by using the authentication virtual code.

For example, the user authentication means 30 may be a financial transaction device, a mobile terminal, a vehicle, a door lock, and the like. However, an embodiment is not limited thereto. For example, the user authentication means 30 includes all devices capable of receiving access authority through user authentication.

The user authentication means 30 receives the authentication virtual code and directly performs user authentication or delivers an authentication virtual code to the server such that user authentication is performed through the server.

In an embodiment, the user authentication means 30 receives the authentication virtual code, and searches for a storage location, at which UID or SID is stored, based on the authentication virtual code. A method of searching for the storage location will be described later. Afterward, the user authentication means 30 performs the user authentication based on the found UID or SID.

In another embodiment, the user authentication means 30 receives an authentication virtual code and transmits the received authentication virtual code to the server 40. The server 40 receives the authentication virtual code and searches for a storage location, at which UID or SID is stored, based on the authentication virtual code. Afterward, the server 40 performs user authentication based on the found UID or SID and transmits information about whether a user is authenticated, to the user authentication means 30.

In the meantime, the user authentication means 30 may be the server 40. In an embodiment, a user of the virtual code generating means 10 may register the virtual code generating means 10 in the user authentication means 30 through the dedicated program, and the user authentication means 30 may store user information in a memory included in the user authentication means 30.

Unless separately mentioned, in this specification, it is described that user authentication based on an authentication virtual code is performed by the user authentication means 30 or the server 40. That is, it is obvious that an embodiment in which one of the user authentication means 30 and the server 40 performs user authentication based on an authentication virtual code is capable of being applied to the other one thereof.

The user authentication means 30 includes a communication unit. The communication unit transmits and receives an authentication virtual code by communicating with the virtual code generating means 10, the virtual code receiving means 20 and the server 40 such that user authentication is performed by using the authentication virtual code. Herein, in addition to near field communication (NFC), Bluetooth, Bluetooth Low Energy (BLE), beacon, radio frequency identification (RFID), infrared data association (IrDA), ultra wideband (UWB), ZigBee, or the like may be used as the wireless communication scheme of the communication unit. However, an embodiment is not limited thereto. For example, the user authentication means 30 may include a communication module for remote wireless communication.

On the other hand, the user authentication means 30 grants access authority through user authentication. The access authority may vary depending on the type of the user authentication means 30. In an embodiment, when the user authentication means 30 is a vehicle, the access authority may be vehicle internal access authority. When the vehicle internal access authority is granted, the vehicle unlocks the vehicle's door lock such that a user is capable of entering the inside of the vehicle.

In an embodiment, when the user authentication means 30 is a door lock, the access authority may be building internal access authority. When the building internal access authority is granted, the door lock is unlocked such that a user is capable of entering the inside of the building.

In another embodiment, when the user authentication means 30 is a mobile terminal, the access authority may be the use authority of the mobile terminal. When the use authority of the mobile terminal is granted, the mobile terminal unlocks a terminal lock such that a user is capable of employing built-in functions of the mobile terminal.

On the other hand, the access authority of the user authentication means 30 may be granted stepwise. In an embodiment, when the user authentication means 30 is a vehicle, the access authority to the vehicle may include internal vehicle access authority, vehicle starting authority, and vehicle driving authority. The vehicle starting authority may start a vehicle and may use devices provided in the vehicle. However, when only the authority incapable of driving the vehicle is granted, the vehicle does not move. Moreover, the vehicle driving authority refers to authority capable of using all functions of the vehicle including driving the vehicle. The user may selectively grant the above-mentioned kind of authority to another person.

In another embodiment, when the user authentication means 30 is a mobile terminal, the access authority may be granted for each application provided in the mobile terminal. For example, the user may grant only the access authority to a camera application provided in the mobile terminal to others.

In the meantime, the user of the virtual code generating means 10 may set a time zone in which the access authority to the user authentication means 30 is granted. In an embodiment, the user of the virtual code generating means 10 transmits accessible time information to the user authentication means 30 or the server 40 through the virtual code generating means 10. The user authentication means 30 or the server 40 stores the accessible time information after matching UID or SID thus pre-stored. Then, the user authentication means 30 or the server 40 determines whether user authentication is performed, based on the stored accessible time information. This will be described later.

The server 40 receives an authentication virtual code and performs user authentication. To this end, the user initially registers the UID or SID to the server 40 through the virtual code generating means 10.

In an embodiment, the user may transmit the UID or SID to the server 40 through the dedicated program. Afterward, the user may store authority information by matching the UID or SID stored in the server 40 through the dedicated program. The server 40 may store authority information by matching the storage location of UID or SID.

In an embodiment, when the virtual code generating means 10 generates an authentication virtual code, the UID or SID may be utilized as seed data. In this way, the inventive concept enables a user to grant access authority to the user authentication means 30 to a plurality of others. This will be described later.

The server 40 searches for a location, at which the UID or SID is stored in the server 40, based on the authentication virtual code generated by the virtual code generating means 10 and verifies the authentication virtual code based on a point in time when the authentication virtual code is received and a point in time when the authentication virtual code is generated by the virtual code generating means 10. A method of performing user authentication by verifying the authentication virtual code will be described in detail later.

Figure 2:
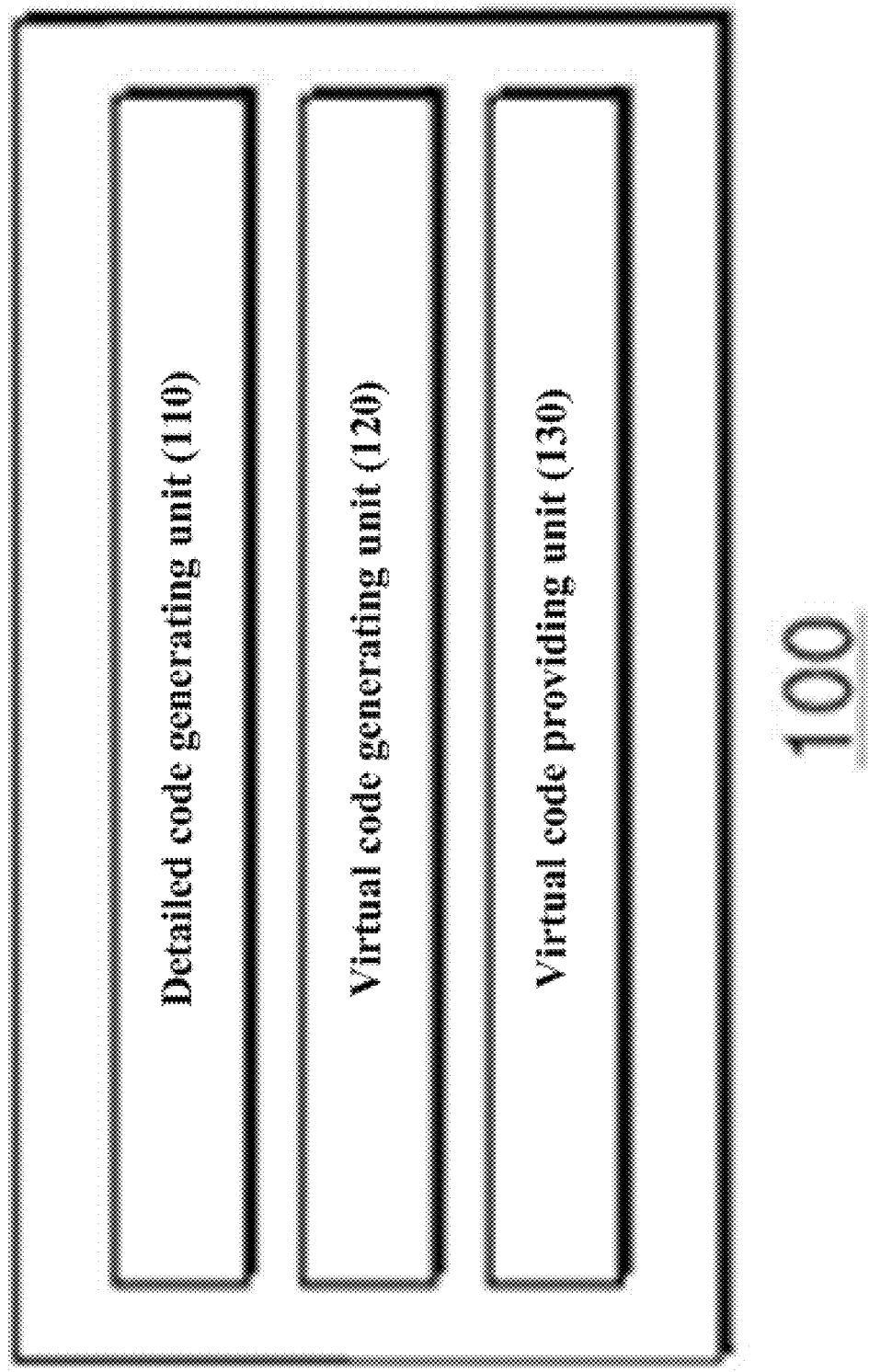
FIG. 2 is a block diagram of an authentication virtual code generating device, according to an embodiment of the inventive concept.

FIG. 2 is a block diagram of a virtual code generating module, according to an embodiment of the inventive concept.

As illustrated in FIG. 2, a virtual code generating device 100 includes a detailed code generating unit 110, a virtual code generating unit 120, and a virtual code providing unit 130.

In an embodiment, the virtual code generating device 100 may be a user terminal in which a program (i.e., an application) that generates an authentication virtual code for user authentication is installed. The virtual code generating device 100 may be the virtual code generating means 10 described above.

The detailed code generating unit 110 may generate one or more detailed codes based on user information.

An authentication virtual code generating function includes one or more detailed code generating functions. For example, when the authentication virtual code includes a plurality of detailed codes, the authentication virtual code generating function generates the plurality of detailed codes by using the plurality of detailed code generating functions and generates an authentication virtual code by using a detailed code combination function to combine the plurality of detailed codes.

At this time, the authentication virtual code is generated for each unit count by the dedicated program built or installed in the virtual code generating device 100 (i.e., a user terminal), and refers to a mobile one time password (mOTP).

In an embodiment, the virtual code generating device 100 may use at least part of user information stored in the virtual code generating device 100 as one of seed data of an authentication virtual code generating function. As a specific example, through one detailed code generating function, the detailed code generating unit 110 generates each detailed code by using UID or SID as seed data of each detailed code generating function. At this time, the detailed code generating unit 110 may generate each detailed code by using a time point or a count value at which user authentication is requested by a user.

In an embodiment, the detailed code generating unit 110 includes a first function and a second function as detailed code generating functions to generate a first code and a second code. At this time, to improve security, the virtual code generating device 100 may only include the first function to generate the first code and the second function to generate the second code as detailed code generating functions and may not include data associated with a correlation between the first code and the second code.

The virtual code generating unit 120 generates an authentication virtual code by combining one or more detailed codes by using an authentication virtual code generating function. In an embodiment, the authentication virtual code may be generated by combining a plurality of detailed codes depending on a specific rule. The authentication virtual code generating function includes a rule (i.e., a detailed code combination function) that combines a plurality of detailed codes. That is, the virtual code generating unit 120 may combine one or more detailed codes by using the detailed code combination function included in the authentication virtual code generating function.

Various methods may be applied to a method of generating one authentication virtual code by combining the plurality of detailed codes. As an example of the detailed code combination function, the authentication virtual code generating unit 120 may generate the authentication virtual code in the manner of alternately positioning the first code of N-digits and the second code of N-digits. Furthermore, as another example, the detailed code combination function may be a function to combine the second code behind the first code. As the length of the detailed code included in the authentication virtual code increases, the detailed code combination function may be generated variously.

Furthermore, in an embodiment, when the authentication virtual code is generated through the combination according to the a specific rule of the first code and the second code, the first code and the second code may have a role of searching for a storage location of UID or SID, at which user information is stored, in a storage location search algorithm. For example, the first code is set to a start point at which a storage location is found, and the second code is set to a search path from the start point to the storage location of the UID or SID depending on a specific search method. That is, when the authentication virtual code generated normally for each unit count is provided by the virtual code generating device 100, a virtual code verifying device 200 determines that a point moving along a search path corresponding to the second code from a search start point corresponding to the first code is a point (a storage location of UID or SID) at which user information is stored. The detailed method of searching for the storage location of UID or SID based on the first code and the second code constituting an authentication virtual code will be described later.

In an embodiment of a method in which the detailed code generating unit 110 generates a detailed code, the detailed code generating unit 110 generates a new detailed code for each unit count, and thus the virtual code generating device 100 generates a new authentication virtual code for each unit count. The authentication virtual code newly generated for each unit count is not generated redundantly. In particular, the detailed code generating unit 110 may be configured such that the authentication virtual code newly generated for each unit count is not redundantly generated between users belonging to a specific group as well as not being generated during a predetermined duration for a specific user or specific the virtual code generating device 100.

In the detailed embodiment of preventing an authentication virtual code from being generated redundantly, when generating the first code or the second code of N digits by using M characters, a detailed code generating function included in an authentication virtual code generating function may generate $M^N$ codes as the first code or the second code and may match each code for each count from an initial time point at which the detailed code generating function is driven. For example, when setting a unit count to 1 second, $M^N$ different codes may be matched every second from a point in time when the detailed code generating function is first driven. Moreover, when a period of using the specific detailed code generating function or a usage period (e.g., the expiration date of a user terminal where an application generating the authentication virtual code is installed) of the virtual code generating device 100 is set to be shorter than a time length (e.g., $M^N$ seconds in the case where 1 count is 1 second) corresponding to $M^N$ counts, the first code or the second code is not generated redundantly during the usage period. That is, when the count increases with time, in the case where a user requests the virtual code generating device 100 to generate a virtual code at a specific time point, the virtual code generating device 100 may generate a code value matched with a count corresponding to a specific time point, as the first code or the second code.

In particular, when alphabetic uppercase characters and numbers from 0 to 9 are used as characters capable of being included in a code (i.e., using 36 characters) and 6 digits are respectively assigned to first and second codes, the virtual code generating device 100 may provide $36^6$ codes as the first code and the second code. At this time, the virtual code generating device 100 may provide the first code and the second code, which are changed for each count, by matching each code for each count.

In the detailed embodiment of preventing the authentication virtual code from being generated redundantly, when the usage period of the virtual code generating device 100 elapses, the authentication virtual code, of which the usage period is different from the previous usage period, may be generated by changing a function (i.e., a first function or a second function) to generate the first code or the second code or by changing the matching relationship between the first code and the second code. In the case where the authentication virtual code is generated by combining the first code generated by the first function and the second code generated by the second function, when the first code generating function or the second code generating function are changed, the virtual code generating device 100 may apply, to a new usage period, the authentication virtual code generating function to generate the authentication virtual code, of which the period is different from the previous period, as an order in which the first code or the second code appears differs from an order in the previous usage period. Furthermore, the virtual code generating device 100 may select the first function and the second function such that a code the same as the authentication virtual code used in the previous usage period does not appear as an authentication virtual code at each count in a new usage period (i.e., such that the matching relationship between the first code generated depending on the first function and the second code generated depending on the second function is not included in the matching relationship included in the previous usage period, at all counts in the new usage period). That is, after a usage period in which $M^N$ codes are capable of being applied once elapses, the authentication virtual code generating function, which does not generate an authentication virtual code, in a new usage period overlapping the previous usage period may be applied by adjusting of updating the authentication virtual code generating function.

Furthermore, in the detailed embodiment of preventing an authentication virtual code from being generated redundantly, the first code may be set to a code value corresponding to a time point (or count) at which the generation of an authentication virtual code is requested, among codes matched for each count from an initial time point at which the first function is operated, and the second code may be set to a code value generated by reflecting a value (e.g., UID or SID) that is always differently present at the same time point such that a redundant authentication virtual code is not generated in the entire period regardless of users. The authentication virtual code may be used as a code value obtained by combining the first code and the second code. Because the first code has a different code value for each count and the second code has a different code value for each UID or SID at the same time point, the authentication virtual code obtained by combining the first code and the second code may be output as a different code value at all the time points.

Furthermore, in another embodiment, one of a plurality of listing rules that list M characters in ascending order may be applied to the authentication virtual code generating function (or the detailed code generating function). That is, the virtual code generating device 100 may variously apply rules, which list M characters in ascending order, to the detailed code generating function included in the authentication virtual code generating function. For example, the listing rule that lists uppercase alphabetic characters in ascending order may be an order of A, B, C, . . . , and Z that is a general order or may be an order of A, C, B, . . . , and Z. As a listing rule is changed by the authentication virtual code generating function, the order, in which codes are matched sequentially to each count, is changed from an initial time point at which the authentication virtual code generating function is driven.

In the meantime, when there is a request to generate an authentication virtual code, the virtual code generating device 100 may receive authority information from a user. The received authority information may be used in two different ways.

First, when there is a request to generate an authentication virtual code, the virtual code generating device 100 may receive authority information from the user and may transmit the authority information to the virtual code verifying device 200 in real time. The virtual code verifying device 200 stores the received authority information after being matched with the corresponding UID or SID.

Second, the virtual code generating device 100 may include the authentication virtual code in the authority information entered from the user. The virtual code verifying device 200, which will be described later, stores an authority code corresponding to a specific authority in advance. When the authentication virtual code includes a specific authority code, the virtual code verifying device 200 may grant authority corresponding to the corresponding authority code. To this end, the authentication virtual code may include an authority code area. The authentication virtual code including authority information will be described later.

In another embodiment, when the virtual code generating device 100 does not receive authority information from the user, the virtual code generating device 100 may generate an authentication virtual code including a specific code (e.g., NULL) in the authority code area. When a specific code is included in an area defining the authority information, the virtual code verifying device 200 may extract UID or SID from an authentication virtual code and may grant authority based on authority information stored after matching the extracted UID or SID.

In another embodiment, when there is a request to generate an authentication virtual code from a user, the virtual code generating device 100 determines whether it is possible to communicate with the virtual code verifying device 200. When it is difficult to communicate with the virtual code verifying device 200, authority information may be received from a user and an authentication virtual code including the received authority information may be generated. In this way, the inventive concept may grant limited access authority even when communication between the virtual code generating device 100 and the virtual code verifying device 200 is difficult.

The virtual code providing unit 130 provides the generated authentication virtual code to the virtual code receiving means 20 to perform user authentication.

Figure 3:
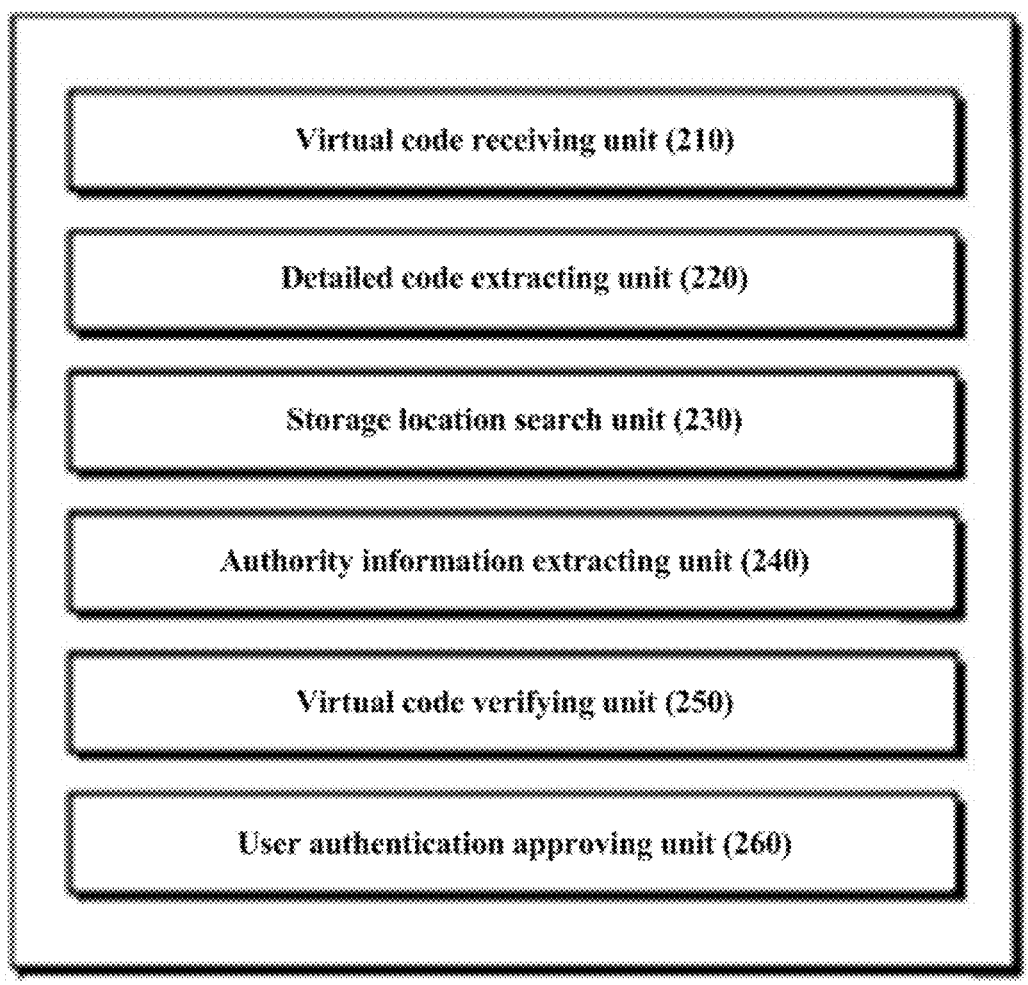
FIG. 3 is a block diagram of an authentication virtual code verifying device, according to an embodiment of the inventive concept.

FIG. 3 is a block diagram of a virtual code verifying device, according to an embodiment of the inventive concept.

The virtual code verifying device 200 may be the user authentication means 30 or the server 40 described above.

As illustrated in FIG. 3, the virtual code verifying device 200 includes a virtual code receiving unit 210, a detailed code extracting unit 220, a storage location search unit 230, an authority information extracting unit 240, a virtual code verifying unit 250, and a user authentication approving unit 260.

Herein, the virtual code verifying device 200 extracts UID or SID based on an authentication virtual code, determines whether the received authentication virtual code is a normal code, based on the authentication virtual code, and performs user authentication.

The virtual code receiving unit 210 receives a request for user authentication based on the authentication virtual code provided from the virtual code providing unit 130.

In an embodiment, the virtual code receiving unit 210 receives the authentication virtual code generated by the dedicated program from the virtual code receiving means 20 and receives a request for user authentication.

The detailed code extracting unit 220 extracts one or more detailed codes included in the authentication virtual code.

In an embodiment, the detailed code extracting unit 220 includes a detailed code combination function included in the authentication virtual code generating function. Accordingly, when the authentication virtual code includes a plurality of detailed codes, the detailed code extracting unit 220 may extract a plurality of detailed codes from the authentication virtual code by applying the detailed code combination function. For example, when the virtual code generating device 100 generates the authentication virtual code obtained by combining two detailed codes (i.e., the first code and the second code), the detailed code extracting unit 220 may separate the first code and the second code by applying the detailed code combination function to the character string array of the authentication virtual code.

The storage location search unit 230 searches for a storage location of UID or SID in a storage location search algorithm, based on the extracted one or more detailed codes. Herein, the storage location search algorithm is matched with the authentication virtual code generating function used when the virtual code generating device 100 generates the authentication virtual code. Various methods may be applied to a method in which the storage location search unit 230 searches for a storage location of UID or SID based on each detailed code. The storage location search unit 230 may include a correlation between detailed codes to search for a storage location based on a plurality of detailed codes.

Herein, the 'storage location' refers to a point (count) on a track corresponding to a point in time when the registration of the virtual code generating means 10 is requested by a user. That is, when a track for the corresponding virtual code generating means 10 is operated in the virtual code verifying device 200, and the registration of specific UID or SID is requested by a specific user at a specific time, the corresponding UID or SID is registered at a count (i.e., a count that has elapsed from the final driving on a track to a registration time point) corresponding to the corresponding time point. In addition, authority information is matched and stored in the storage location of the UID or SID.

In an embodiment of having a correlation between detailed codes, when the authentication virtual code is composed of the first code and the second code, the storage location search unit 230 may determine a search start point corresponding to the first code and may search for a point, which is moved along a search path corresponding to the second code from the search start point, as the storage location of the UID or SID. That is, the detailed code may include the first code for setting the start point of a storage location search and the second code for setting the search path from the start point to the storage location of the UID or SID, depending on the specific search method.

Moreover, in another embodiment, as the virtual code generating device 100 provides a new authentication virtual code for each unit count, the virtual code verifying device 200 may set the search start point and the search path based on the first code and the second code, which are changed for each count, and then may search for the storage location of UID or SID.

Furthermore, in another embodiment, to search for the storage location of UID or SID by using a plurality of detailed codes having the correlation, the storage location search unit 230 may include the storage location search algorithm. The storage location search algorithm refers to an algorithm capable of searching for the storage location upon applying each detailed code included in the authentication virtual code, and is matched with the authentication virtual code generating function used when the virtual code generating device 100 generates the authentication virtual code.

For example, in the case where the authentication virtual code includes the first code for determining a search start point of the storage location and the second code for presenting a storage location direction from the search start point, when allowing a direction to be changed to a direction corresponding to the second code at a point corresponding to the first code, the storage location search algorithm refers to an algorithm that adjusts the storage location with which the registration time point of the UID or SID is matched to be positioned at the corresponding location.

The authority information extracting unit 240 extracts authority information stored after matching the storage location of UID or SID found by the storage location search unit 230. That is, the virtual code verifying device 200 may extract the authority information stored after matching the storage location of each UID or SID in the storage location discovery algorithm. The user authentication approving unit 260 utilizes the extracted authority information to determine whether to perform user authentication. This will be described later.

As the storage location search algorithm is used, even though the first code and the second code included in the authentication virtual code are changed, the virtual code verifying device 200 may discover the UID or SID storage location. Various methods may be applied to the storage location search algorithm, and the detailed exemplification thereof will be described later. However, the storage location search algorithm is not limited to the exemplification described below.

Figure 5:
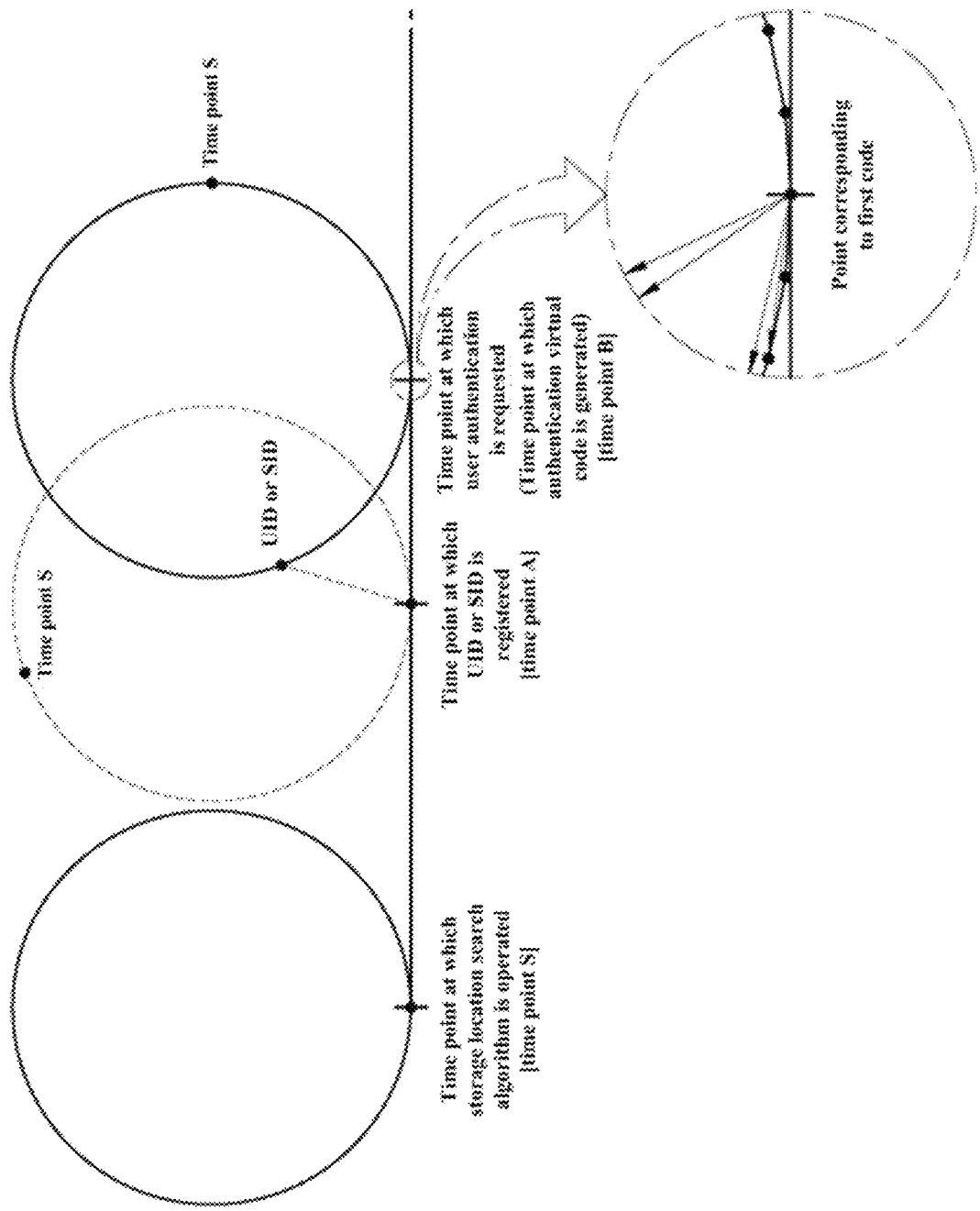
FIG. 5 is an exemplary view illustrating a storage location search algorithm for searching for a storage location of UID or SID through rolling movement of a k-polygon, according to an embodiment of the inventive concept.

For example, referring to FIG. 5, when the storage location search algorithm corresponds to a k-polygon ('k' is $M^N$) that performs rolling movement along a track on which $M^N$ codes corresponding to the first code is arranged, and when a vertex of the k-polygon moves while corresponding to a point at which a code is positioned on a first code track, each vertex of the k-polygon is matched with a storage location of UID or SID and a point at which the first code track (e.g., a first track) corresponds to the k-polygon is a storage location search start point corresponding to the first code. At this time, the storage location search unit 230 may apply rolling movement to the k-polygon such that the vertex of the k-polygon is in contact with the point corresponding to the first code extracted by the detailed code extracting unit 220. As such, as the storage location search unit 230 allows an angle to be changed to an angle (e.g., a specific angle obtained by dividing 180 degrees into $M^N$ pieces so as to face the vertex of the k-polygon) corresponding to the second code at a location on the first track, which the k-polygon contacts, the storage location search unit 330 may search for the vertex of the k-polygon that is a storage location at which the UID or SID corresponding to an authentication virtual code is stored.

In particular, as illustrated in FIG. 5, the virtual code verifying device 200 may perform rolling movement (i.e., each vertex of the k-polygon moves while sequentially being in contact with each point on the track) to the point corresponding to the first code on the k-polygon. Afterward, the virtual code verifying device 200 allows the angle direction to be changed to the angle direction corresponding to the second code to search for the vertex corresponding to the storage location.

After the storage location search unit 230 searches for a storage location of UID or SID by using the first code and the second code in the authentication virtual code within the storage location search algorithm, the authority information extracting unit 240 extracts authority information stored after matching the corresponding location.

Various storage location search algorithms will be described in detail later.

The virtual code verifying unit 250 verifies the authentication virtual code by comparing a point in time when the virtual code reception unit 210 receives the authentication virtual code with a point in time when the authentication virtual code is generated by using the authentication virtual code generating function by an authentication virtual code generating means (i.e., a user terminal).

Figure 6:
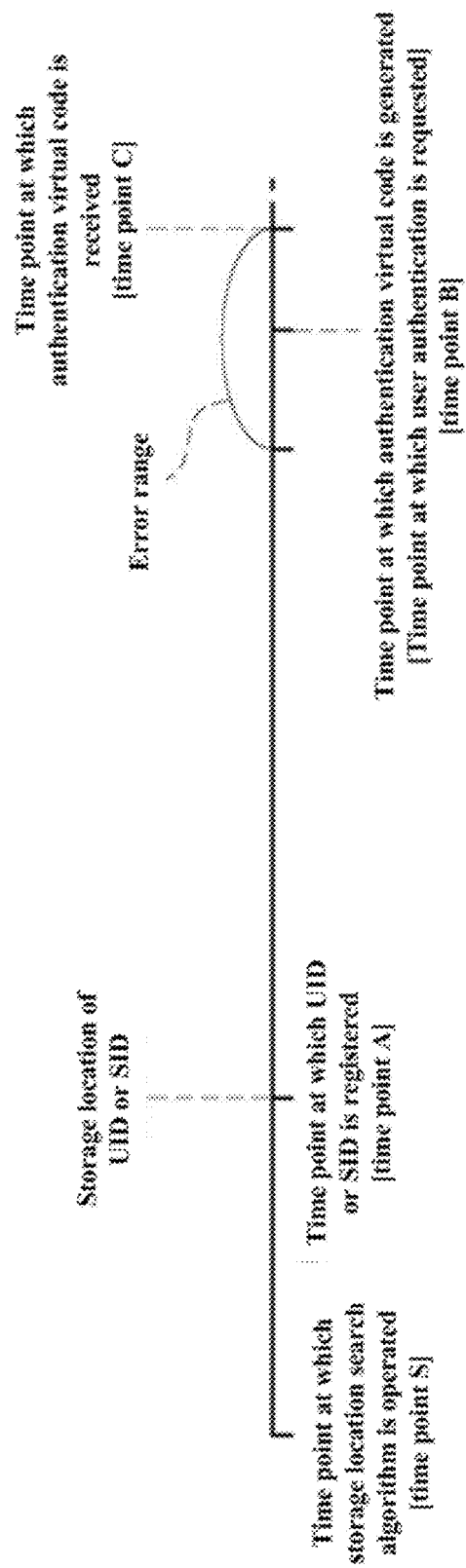
FIG. 6 is an exemplary view for describing verification of an authentication virtual code, according to an embodiment of the inventive concept.

In an embodiment, referring to FIG. 6, the virtual code verifying unit 250 may compare a point in time when the authentication virtual code is received with a point in time when the authentication virtual code is generated by using the authentication virtual code generating function in the dedicated program built or installed in the user terminal. When the generation time is included within a preset error range from the reception time, the virtual code verifying unit 250 may determine that the received authentication virtual code is a normal code.

Furthermore, in another embodiment associated with a method of verifying an authentication virtual code, the first code and the second code may be codes for a reference count added by an OTP code generated randomly from a point in time when the UID or SID is registered by the virtual code generating means 10 or when user authentication is requested.

As the detailed embodiment, the virtual code generating device 100 generates the virtual security code by reflecting the virtual security code to the first code and the second code, without outputting the virtual security code to the outside. The authentication virtual code generating means (e.g., a dedicated program of generating an authentication virtual code) generates a virtual security code value (e.g., OTP code) based on the UID or SID (i.e., a unique value), generates the first code at a count, to which the virtual security code value is added, at a point in time when the UID or SID is registered, and generates the second code at a count corresponding to the virtual security code value (i.e., generates the virtual security code itself as the second code). That is, the first code and the second code are generated by the virtual code generating means 100 based on a count shifted by the virtual security code value from a time point 'A' at which the UID or SID is registered in the virtual code verifying device 200. The count shifted from the time point 'A' may be a count earlier or later than a count corresponding to the current time point depending on the generated virtual security code value. The virtual code verifying device 200 may apply the received first code and the received second code to a storage location search algorithm and then may search for a storage location (or a registration location) of the UID or SID. In this way, it is impossible for other people to identify an order in which the first code and the second code constituting the authentication virtual code are provided, thereby improving security.

Furthermore, in another embodiment, after extracting the virtual security code from the second code generated based on the virtual security code, the virtual code verifying device 200 may determine whether there is a value the same as the virtual security code among OTP numbers calculated by entering a count within a specific range from a count, at which an authentication virtual code is received, by means of a virtual security code generating function (i.e., an OTP function). The virtual code verifying device 200 obtains the virtual security code value (i.e., an OTP function value) used to generate the second code by applying the inverse function of the second function to the second code and searches for the count at which a value the same as the virtual security code value is calculated. As there is a difference between a time point at which the virtual security code is generated by the authentication virtual code generating means and a time point at which the authentication virtual code verifying means receives the virtual security code due to the transmission time or delay of the authentication virtual code, a count at which the authentication virtual code verifying means receives the authentication virtual code may not be identical to a count at which the OTP number corresponding to the virtual security code is generated, and thus the virtual code verifying device 200 allows an error range from a count at which the authentication virtual code is received. In this way, the virtual code verifying device 200 may prevent user authentication from being performed with the previously-generated authentication virtual code instead of the currently-generated authentication virtual code, thereby improving security. Moreover, even though a user does not enter a virtual security code of specific digits when the user enters the authentication virtual code, the virtual code verifying device 200 may search for the virtual security code and then may verify the user.

Figure 7:
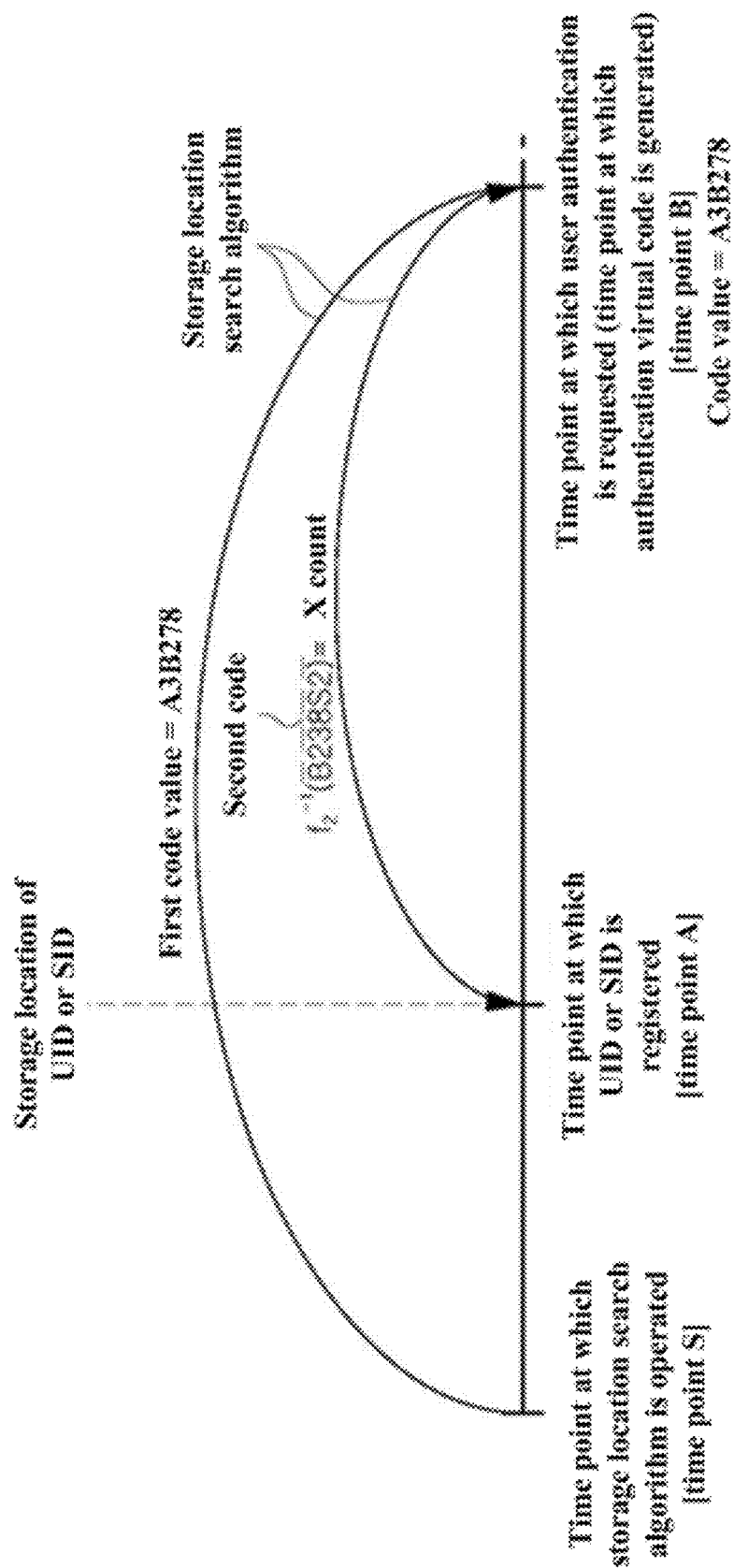
FIG. 7 is an exemplary view illustrating a storage location search algorithm for searching for a storage location of UID or SID by moving on a track based on a detailed code, according to an embodiment of the inventive concept.
Figure 8:
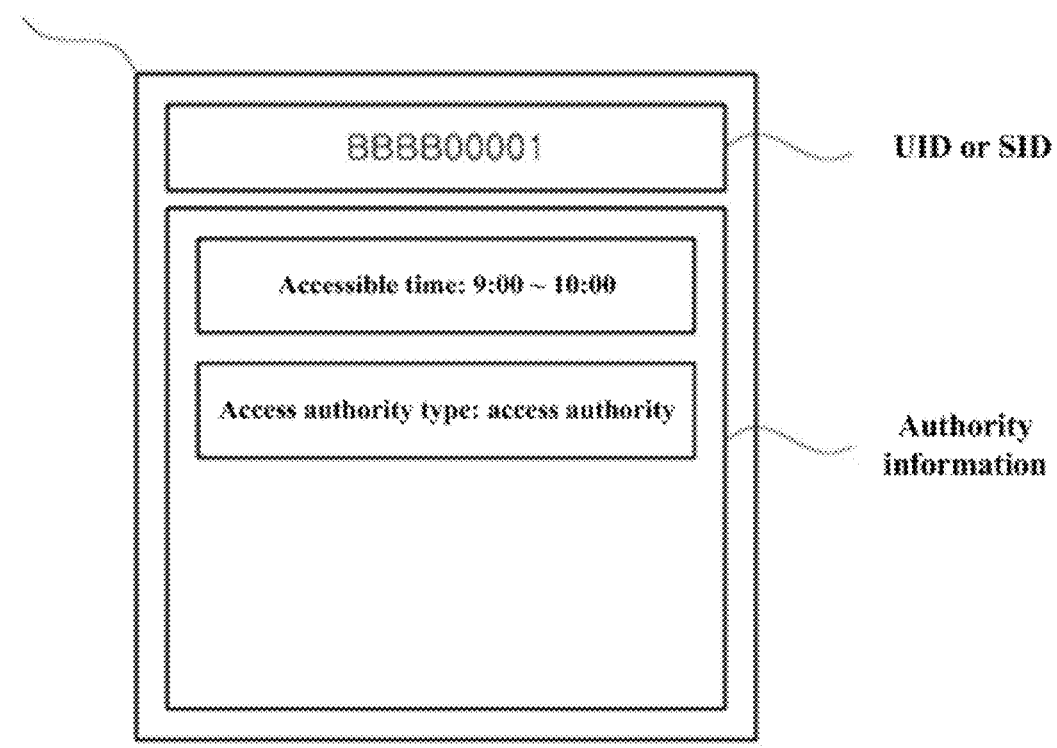
FIGS. 8 and 9 are exemplary diagrams for describing a storage space of a virtual code verifying device, according to an embodiment of the inventive concept.

Besides, in another embodiment, referring to FIG. 7, the virtual code verifying device 200 generates a first code corresponding to the count obtained by adding UID or SID to a time point (time point 'B') when user authentication is requested and generates a second code corresponding to a count obtained by adding a virtual security code value to a count difference between a time point (time point 'A') when the UID or SID is registered and a time point (time point 'B') when user authentication is requested. That is, equations in which a dedicated program of generating an authentication virtual code generates the first code and the second code are as follows.

First code=f1(count at time point 'B'+virtual security code)

Second code=f2(count at time point 'B'−count at time point 'A'+virtual security code)

(time point 'A': a time point at which UID or SID is registered, time point 'B': a count at a time point at which user authentication is requested, and virtual security code: OTP number)

The virtual code verifying device 200 searches for a location, at which UID or SID is stored, based on the first code and second code in the received authentication virtual code and generates a virtual security code (i.e., OTP number) within a specific count range from a time point at which a user authentication request is received, based on the location.

Afterward, as the virtual code verifying device 200 searches for a point, at which user information is stored, based on the first code and the second code, the virtual code verifying device 200 grasps a time point (time point 'A') at which the UID or SID is registered. The server 40 calculates a calculation value corresponding to a sum of a count value to each count within a specific count range and the virtual security code (i.e., an OTP number), based on the time point, at which a request for user authentication is received, from a time point (time point 'A'), at which the UID is registered, and determines whether there is a count the same as a count value (i.e., a value obtained by applying the inverse function of the second function to the second code) corresponding to the second code in each of the calculation values. In this way, the server 40 may determine whether the authentication virtual code is normally provided.

In the meantime, the authentication virtual code may include authority information. In an embodiment, the authentication virtual code may include the first code, the second code, and time information. Here, the time information may include at least one of data for defining an available time of the authentication virtual code and data for defining an accessible time. That is, the authentication virtual code may include data associated with at least one of a time point, at which user authentication is possible, and a time range in which user authentication is possible.

In another embodiment, when the virtual code verifying device 200 is a vehicle, the authentication virtual code may include authority information associated with at least one of in-vehicle access authority, vehicle starting authority, and vehicle driving authority.

The authority information may be included in an area, which is separately allocated, in the authentication virtual code. The virtual code verifying device 200 may extract the authority information from the allocated area and may grant authority corresponding to the extracted authority information.

In the meantime, a virtual security code included in the first code and the second code may be formed as a count corresponding to a point in time when the authentication virtual code is capable of being used, not a point in time when the authentication virtual code is generated. In detail, equations in which a dedicated program of generating an authentication virtual code generates the first code and the second code are as follows.

First code="UID or SID"+OTP (a virtual security code based on a point in time when a user is capable of employing an authentication virtual code set by authority)

Second code=OTP (a virtual security code based on a point in time when a user is capable of employing an authentication virtual code set by authority)

When an authentication virtual code generation request is received from a user, the virtual code generating device 100 receives authentication virtual code available time from the user or forms a virtual security code based on the accessible time information stored after matching the UID or SID selected by the user, and forms the first code and the second code based on the formed virtual security code.

The virtual code verifying device 200 searches for a location, at which UID or SID is stored, based on the first code and second code in the received authentication virtual code, generates a virtual security code (i.e., OTP number) within a specific count range from a time point, at which a user authentication request is received, based on the location, and determines whether there is a code identical to the virtual security code extracted from the authentication virtual code in the generated virtual security code. When there is a code identical to the virtual security code extracted from the authentication virtual code in the generated virtual security code, the virtual code verifying device 200 performs user authentication.

In the meantime, the authentication virtual code may include time information about the generation time of the authentication virtual code. In an embodiment, the authentication virtual code may include first to third codes. In detail, equations in which a dedicated program of generating an authentication virtual code generates the first to third codes are as follows.

First code=generation time code (time-stamp)+OTP (a virtual security code based on a point in time when a user is capable of employing an authentication virtual code set by authority)

Second code=first code−"UID or SID"

Third code=generation time code (time-stamp)

When an authentication virtual code generation request is received from a user, the virtual code generating device 100 receives authentication virtual code available time from the user or generates a virtual security code based on the accessible time information stored after matching the UID or SID selected by the user and generates the first code and the third code based on the generated virtual security code and data associated with a point in time when an authentication virtual code is generated. Meanwhile, the virtual code generating device 100 forms the second code based on the generated first code and UID or SID selected from the user.

The virtual code verifying device 200 searches for a location, at which UID or SID is stored, based on the first code and second code in the received authentication virtual code, generates a virtual security code (i.e., OTP number) within a specific count range from a time point, at which a user authentication request is received, based on the location, and determines whether there is a code identical to the virtual security code extracted from the authentication virtual code in the generated virtual security code. Besides, the virtual code verifying device 200 calculates data regarding an authentication virtual code available time from the virtual security code and calculates a difference between the calculated time data and generation time data included in the third code. Only when the difference value is within a preset range, the virtual code verifying device 200 performs user authentication. The range may be set by the user In this way, even when there is a difference between the generation time of the authentication virtual code and the authentication virtual code available time, the inventive concept may determine whether the corresponding authentication virtual code is a code thus normally generated.

In the meantime, even when the virtual code generating device 100 does not register the virtual code generating device 100 to the virtual code verifying device 200, the virtual code generating device 100 may generate an authentication virtual code capable of performing user authentication.

In an embodiment, the virtual code generating device 100 may generate the first code and the second code by using a unique value of the virtual code verifying device 200 as seed data. In this case, the virtual code generating device 100 may receive authority information from the user and then may include the entered authority information in the authentication virtual code. The virtual code verifying device 200 extracts a unique value from the first and second codes and determines whether the extracted unique value is the same as a unique value of the virtual code verifying device 200. When the extracted unique value is the same as the unique value of the virtual code verifying device 200, the virtual code verifying device 200 extracts authority information from the authentication virtual code and then grants access authority corresponding to the authority information. In this way, even when the user does not register the virtual code generating device 100 in the virtual code verifying device 200, the inventive concept may perform user authentication for others.

When the authentication virtual code is completely verified by the virtual code verifying unit 250, the user authentication approval unit 260 approves the user authentication.

In an embodiment, in case of user authentication upon entry, when the UID or SID is found by the storage location search unit 230 and whether the authentication virtual code is normally generated by the virtual code verifying unit 250 is completely verified, the user authentication approving unit 260 determines whether to perform user authentication, based on the authority information extracted by the authority information extracting unit 240.

In detail, the user authentication approving unit 260 determines whether to perform user authentication, by comparing the accessible time information included in the authority information with a point time at which the user authentication is requested.

In an embodiment, when registering the UID or SID in the virtual code verifying device 200 or after registering the UID or SID in the virtual code verifying device 200, the user may register accessible time through the dedicated program. The dedicated program stores the accessible time received from the user after matching the UID or SID. The user may change or delete the accessible time matching the UID or SID through the dedicated program.

In an embodiment, when the user authentication request is made within the accessible time range stored after matching the UID or SID, the user authentication approving unit 260 performs user authentication. As a specific example, when the user sets the accessible time to a time from 9:00 AM to 10:00 AM, the user authentication approving unit 260 performs user authentication on only the user authentication requests made between 9:00 AM and 10:00 AM.

Meanwhile, the accessible time may be set differently for each UID and SID. The virtual code verifying device 200 may match and store each of the UID and the SID and accessible time information corresponding thereto. In this way, when it is necessary to grant access authority to a plurality of people for one device, it is possible to set an accessible time for each target having the access authority.

In an embodiment, when registering the UID or SID in the virtual code verifying device 200 or after registering the UID or SID in the virtual code verifying device 200, the user may register the type of the access authority through the dedicated program. The dedicated program stores the type of the access authority received from the user after matching the UID or SID. The user may change or delete the type of the access authority matching the UID or SID through the dedicated program.

In an embodiment, the user authentication approving unit 260 performs user authentication corresponding to the type of the access authority included in authority information. When the virtual code verifying device 200 is a vehicle, the user authentication approving unit 260 may grant one of in-vehicle access authority, vehicle starting authority, and vehicle driving authority based on the authority information. When the in-vehicle access authority is granted, the vehicle unlocks the vehicle's door lock and deactivates other vehicle functions. Furthermore, when the vehicle starting authority is granted, the vehicle unlocks the vehicle's door lock. When a user who entered the inside of the vehicle starts an engine, the vehicle may be started. In a state where the vehicle is started, the vehicle makes it impossible to move. Moreover, where the vehicle driving authority is granted, the vehicle allows the user to employ all the functions of the vehicle.

In an embodiment, in the case where the virtual code verifying device 200 is a mobile terminal, when registering the UID or SID in the virtual code verifying device 200 or after registering the UID or SID in the virtual code verifying device 200, the user may register an application executable in the mobile terminal. After that, the mobile terminal allows only the registered application to be executed during user authentication.

Figure 4:
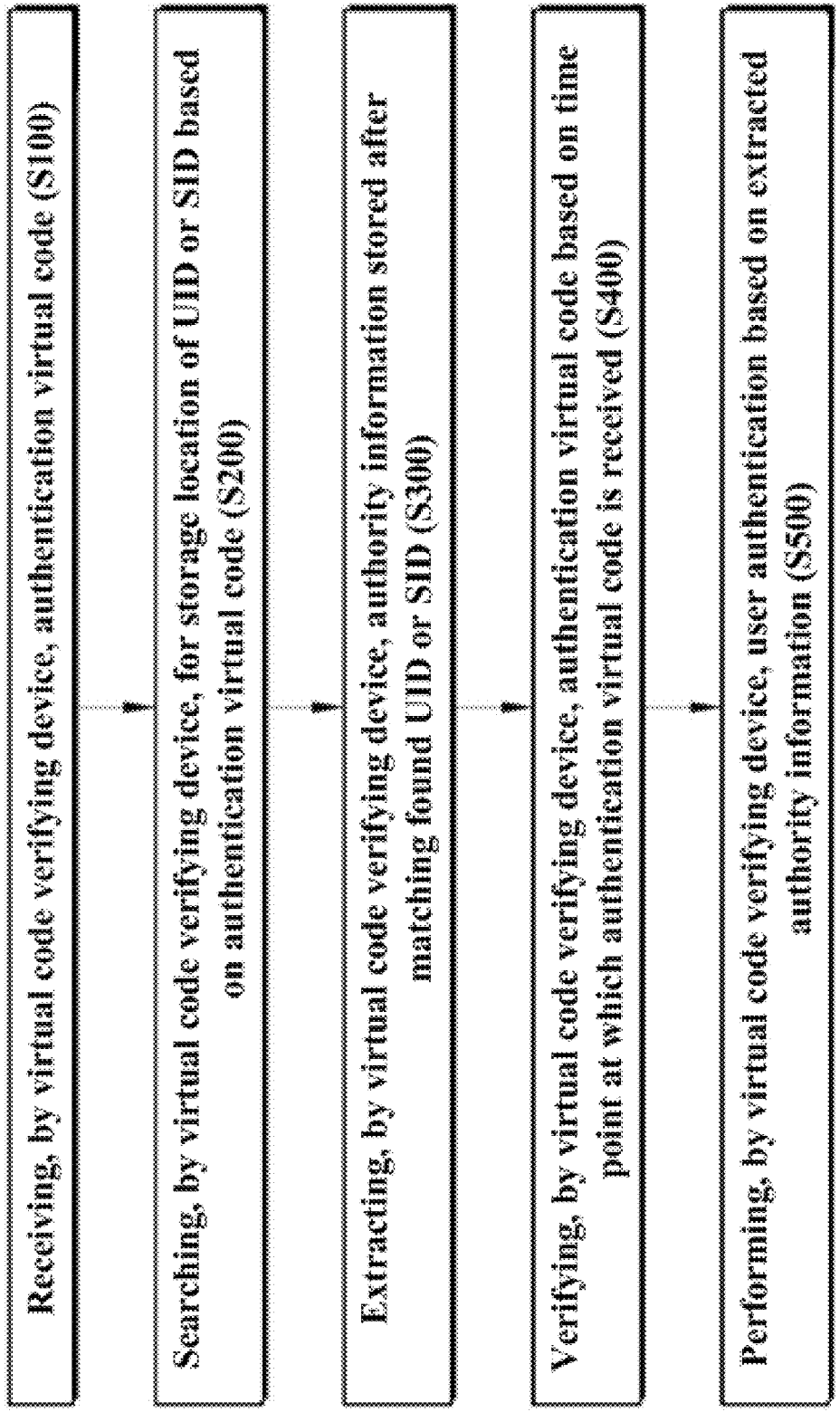
FIG. 4 is a flowchart of a user authentication method by using an authentication virtual code, according to an embodiment of the inventive concept.

FIG. 4 is a flowchart of a user authentication method by using an authentication virtual code according to an embodiment of the inventive concept.

Referring to FIG. 4, according to an embodiment of the inventive concept, a user authentication method using an authentication virtual code includes step S100 of receiving, by a virtual code authentication device, an authentication virtual code (an authentication virtual code receiving step), step S200 of searching, by the virtual code authentication device, for UID or SID based on the authentication virtual code (a storage location search step), step S300 of extracting, by the virtual code authentication device, authority information stored after matching a storage location of the found UID or SID, step S400 of verifying, by the virtual code authentication device, the authentication virtual code based on a point in time at which the authentication virtual code is received, and steps S500 of approving, by the virtual code authentication device, user authentication based on the authority information. Hereinafter, the detailed description of each operation is provided. However, the detailed disclosure given in a description process associated with the virtual code generating device 100 (i.e., a user terminal including a dedicated program) and the virtual code verifying device 200 (the user authentication means 30 or the server 40) is omitted.

In operation S100, the virtual code verifying device 200 receives a request for user authentication by receiving an authentication virtual code. Here, the authentication virtual code is generated by the authentication virtual code generating function included in a program for generating an authentication virtual code based on UID or SID.

According to one embodiment, the authentication virtual code may be generated based on the UID or SID included in the virtual code generating device 100.

The virtual code generating device 100 generates an authentication virtual code based on UID or SID by using the authentication virtual code generating function included in the dedicated program and provides the generated authentication virtual code to the virtual code verifying device 200.

In an embodiment, through the dedicated program, the virtual code generating device 100 may generate each detailed code by using the UID or SID as seed data of each detailed code generating function.

When generating a plurality of detailed codes by using each detailed code generating function, the virtual code generating device 100 may generate the authentication virtual code in which the plurality of detailed codes are combined, by using the detailed code combination function included in an authentication virtual code generating function. For example, through the dedicated program, the virtual code generating device 100 will generate an authentication virtual code by using the UID or SID as seed data.

In addition, the authentication virtual code may be generated in various manners. That is, the authentication virtual code may be generated by various authentication virtual code generating functions. The detailed description of generating an authentication virtual code in various manners will be the same as the description given with reference to FIG. 5, and thus the detailed disclosure is omitted to avoid redundancy.

Afterward, in step S200, the virtual code verifying device 200 searches for a storage location of UID or SID in a storage location search algorithm based on the authentication virtual code. Herein, the storage location search algorithm may be matched with the authentication virtual code generating function included in the dedicated program built or installed in the virtual code generating device 100 (i.e., a user terminal), and may search for the storage location of UID or SID based on at least one detailed code in the authentication virtual code.

When the registration request of the UID or SID is received through the virtual code generating device 100, the virtual code verifying device 200 registers the UID or SID at a specific point (count) corresponding to the requested time point in the storage location search algorithm for the corresponding UID or SID and stores authority information at the corresponding point.

In an embodiment, separate authority information may be matched and stored in each ID. The user may register authority information together when registering UID or SID or may update authority information as needed after registering only the UID or SID first.

In another embodiment, the separate authority information may be matched and may not be stored in each ID. At least one SID may be stored after matching the storage location of the UID. Authority information may be matched and stored in each of at least one SID. When there is no authority information stored after matching a specific ID, the virtual code verifying device 200 may perform user authentication as long as it is verified that the authentication virtual code is valid.

When generating an authentication virtual code, the user may select an ID that will be the seed data for generating a virtual code. The user may receive unconditional access authority to the user authentication means 30 or may grant the unconditional access authority to others, by generating an authentication virtual code based on UID. However, the authentication virtual code may not be used after a specific period.

Besides, the user may grant restricted access authority to others by generating an authentication virtual code based on SID. For example, the user may register an accessible time stored after matching the SID. Then, the user may restrict the accessible time to the user authentication means 30 to others by generating an authentication virtual code based on the corresponding SID. The authentication virtual code is not available after the accessible time.

As another example, the user may register the type of the access authority stored after matching the SID. Then, the user may restrict the type of the access authority to the user authentication means 30 to others by generating an authentication virtual code based on the corresponding SID.

After the UID or SID is registered on the virtual code verifying device 200, the virtual code verifying device 200 may receive the authentication virtual code through the virtual code generating device 100. When receiving a request for user authentication, the virtual code verifying device 200 may identify a user by searching for UID or SID stored in the storage location search algorithm based on the received authentication virtual code.

According to an embodiment, when the authentication virtual code is generated by combining the first code and the second code, the server 40 searches for the storage location of UID or SID in the storage location search algorithm by using the first code and the second code. For example, the first code may be a code for setting a start point of the storage location search of the UID or SID in the storage location search algorithm. The second code may be a code for setting a search path from the start point to the storage location of the UID or SID in the specific search manner.

As illustrated in FIG. 5, the virtual code verifying device 200 sets the location corresponding to the first code to the start point and searches for the storage location of UID or SID or a point (i.e., the specific vertex of a k-polygon) matched to the storage location of UID or SID in the placement state of the k-polygon, based on the second code in the search manner applied to the second code. The storage location is matched to each vertex of the k-polygon. The point at which the first code track (i.e., a first track) corresponds to the k-polygon is the start point of the storage location search corresponding to the first code. The virtual code verifying device 200 searches for the matching point of the storage location of UID or SID at the search start point based on the second code.

Various methods may be applied to the method of searching for a storage location in the k-polygon based on the second code. For example, the virtual code verifying device 200 allows an angle to be changed to an angle (e.g., a specific angle obtained by dividing 180 degrees into $M^N$ pieces to face the vertex of the k-polygon) corresponding to a second code at a location on the first track, which the k-polygon contacts, the virtual code verifying device 200 may search for a vertex of the k-polygon that is a storage location, at which the UID or SID is stored, based on the authentication virtual cord.

Furthermore, for another example, in a state where the k-polygon is in contact with the point corresponding to the first code on the first track, the virtual code verifying device 200 divides the whole central angle (i.e., 360 degrees) into $M^N$ pieces based on the center of the k-polygon and the contact point on the first track, and matches each angle to $M^N$ second codes. At this time, the direction of the line moving by unit angles (i.e., 360 degrees/$M^N$) of specific numbers from the line connecting the center of the k-polygon to the contact point on the first track faces the specific vertex of the k-polygon. Accordingly, when the second code corresponding to the specific angle is received, the virtual code verifying device 200 may search for the vertex positioned in the corresponding angle direction.

Furthermore, for another example, the specific digit of the second code may be used to determine an angle calculation direction. That is, when the second code is generated using 'N' ('N' is a natural number) characters, the angle measurement direction may be determined with one digit. For example, when the virtual code verifying device 200 divides the whole central angle (i.e., 360 degrees) based on the center of the k-polygon and a contact point on the first track and matches the second code to each angle, the virtual code verifying device 200 may determine whether the angle is an angle measured to the right from a line connecting the center of the k-polygon to the contact point on the first track or whether the angle is an angle measured to the left.

For example, the storage location search algorithm may assign two second codes different from each other depending on the angle measurement direction at each vertex on the k-polygon, to one vertex. That is, the second codes different from each other may be matched thereto at the arrival to one vertex with an interior angle and at the arrival to one vertex with an exterior angle, and the storage location of another UID or SID may be connected thereto. For another example, when the second code is generated by using 'N' characters ('N' is a natural number), the storage location search algorithm may match (N-1) characters with half of the total angle (e.g., 360 degrees in the case where the total angle is divided based on the center angle) and may determine the angle application direction for reaching each vertex by using one digit.

The method of searching for a storage location in the k-polygon based on the second code is not limited thereto. For example, various methods such as the method of searching for a point for dividing space between a point on the k-polygon corresponding to the second code and a contact point on the first track at a specific ratio, as the storage location may be applied.

According to another embodiment, when the authentication virtual code includes the first code and the second code that are changed for each unit count, the first code is generated based on an unit count elapsed from the first time point at which the virtual code verifying device 200 starts the registration of UID or SID, and the second code is generated based on an unit count elapsed from a time point at which UID or SID is registered through the dedicated program installed in the virtual code generating means 10. At this time, the unit count is set to a specific time interval and is changed as a time interval elapses.

As illustrated in FIG. 7, the storage location search algorithm is used to move to a point matched to a storage location of UID or SID while moving on a track based on a plurality of detailed codes constituting the authentication virtual code.

In detail, as a service is driven, when the authentication virtual code includes the first code generated based on a unit count that has elapsed from an initial time point at which the storage location search algorithm is started, and the second code generated based on a unit count that has elapsed from a time point, at which the UID or SID of each user is registered, as illustrated in FIG. 7, the virtual code verifying device 200 sets a count on a track matched with a code value corresponding to the first code to a search start point, returns along the track from the search start point by a count value corresponding to the second code, and searches for a point (i.e., a storage location of UID or SID) on the track at the time point at which the UID or SID is registered in the virtual code verifying device 200. For example, the virtual code verifying device 200 searches for a point (or count), to which the first code in the authentication virtual code is assigned, on a track for the first code to set the search start point, reversely positions a track for the second code from the search start point, searches for a point (or count), to which the second code in the authentication virtual code is assigned, and extracts a point (or count), at which the UID or SID is registered, on the track for the first code. Furthermore, for example, as the virtual code verifying device 200 sets the search start point based on the first code in the authentication virtual code, returns by a count value calculated as the inverse function of the second function is applied to the second code in the authentication virtual code, and searches for the point corresponding to a time point at which the UID or SID is registered therein.

Afterward, in step S300, the virtual code verifying device 200 extracts authority information stored after matching the found UID or SID storage location.

In detail, the virtual code verifying device 200 extracts authority information stored after matching the storage location of the found UID or SID. That is, because the virtual code verifying device 200 stores authority information in each UID or SID storage location in the storage location search algorithm, the virtual code verifying device 200 may extract authority information stored after matching the storage location of a specific UID or SID in the storage location search algorithm.

Figure 9:
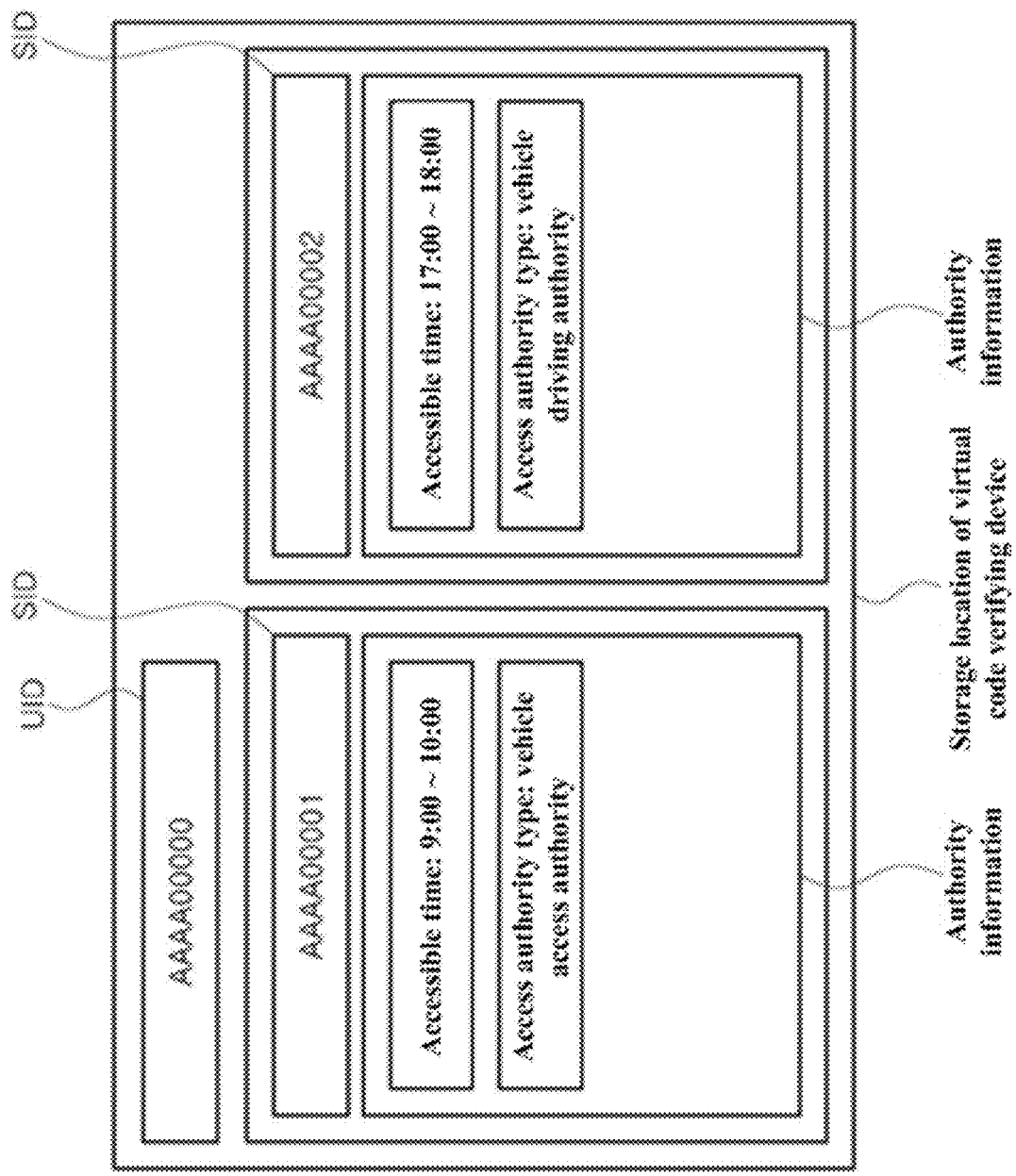

In the meantime, upon registering the UID or SID, any authority information may not match the storage location of the UID or SID depending on a user's setting method. For example, the user may not register any authority information after registering UID or SID through the dedicated program. Also, as shown in FIG. 9, the virtual code generating device 100 and the virtual code verifying device 200 do not match and store the authority information in the UID storage location. The SID may be stored after matching the UID storage location. The authority information may be matched and stored in each SID storage location.

Afterward, in operation S400, the virtual code verifying device 200 verifies an authentication virtual code based on a time point at which the authentication virtual code is received. In detail, the virtual code verifying device 200 may compare a time point, at which the received authentication virtual code is received, with a time point, at which the authentication virtual code generated by using an authentication virtual code generating function is generated by the authentication virtual code generation program, and, as illustrated in FIG. 6, may determine that the received authentication virtual code is a normal code, when the generation time point is included within an error range from the reception time point.

In an embodiment, when performing user authentication upon requesting access, the virtual code verifying device 200 may determine whether a user requesting user authentication upon requesting access has requested user authentication at a current time by using the UID or SID of a person granting authority, by comparing the reception time of the authentication virtual code with the generation time of the authentication virtual code in the storage location search algorithm.

In a specific embodiment, when a user makes a request for generating an authentication virtual code by using the virtual code generating device 100, the dedicated program built or installed in a user terminal generates an authentication virtual code (in particular, the second code) based on a count value corresponding to a request time point (i.e., a generation time point) by using the authentication virtual code generating function. In an embodiment, one detailed code (e.g., the second code) among a plurality of detailed codes may be generated by using an OTP function that uses the generation time point as seed data. That is, the OTP code may be generated to be included in the second code.

Afterward, the generated authentication virtual code is provided to the virtual code verifying device 200. The virtual code verifying device 200 extracts a plurality of detailed codes by using an authentication virtual code generating function or a storage location search algorithm matched with the authentication virtual code generating function. Moreover, the OTP code is extracted through one detailed code (e.g., the second code) among the plurality of detailed codes, and a point in time when the authentication virtual code is generated is extracted through the OTP code.

Afterward, the virtual code verifying device 200 may verify whether the authentication virtual code is generated at a current time point, by comparing a time point, at which the authentication virtual code is received, with a time point at which the authentication virtual code is generated by the virtual code generating device 100. That is, when the generation time point of the authentication virtual code is included within a range including a preset count value from the time point at which the authentication virtual code is received, the virtual code verifying device 200 verifies that the authentication virtual code is generated at the current time.

In the meantime, when authority information stored after matching the UID or SID storage location includes accessible time information, the virtual code verifying unit 250 may determine whether the authentication virtual code is normal, based on the accessible time information. In detail, when the reception time point of the authentication virtual code is within a time zone defined by the accessible time information, the virtual code verifying unit 250 may determine that the received authentication virtual code is normal. In this case, even though the authentication virtual code is generated before the time zone defined by the accessible time information, the authentication virtual code may be used effectively only within the time zone defined by the accessible time information.

In step S500, when it is determined that the authentication virtual code is a normal code, the virtual code verifying device 200 performs user authentication based on authority information stored after matching the UID or SID storage location.

In an embodiment, when the accessible time information is matched and stored in UID or SID storage location, the virtual code verifying device 200 performs user authentication by comparing the reception time of the received authentication virtual code with the time zone corresponding to the accessible time information. In detail, only when the reception point is within the time zone corresponding to the accessible time information, the virtual code verifying device 200 performs user authentication.

In the meantime, in the case where ID extracted from the authentication virtual code is UID, when it is determined that the authentication virtual code is a normal code, the virtual code verifying device 200 may perform user authentication regardless of the authority information stored after matching the storage location of the UID. The virtual code verifying device 200 may determine whether the ID extracted from the authentication virtual code is UID, based on an ID creation rule or whether there is another ID stored after matching a storage location of the ID.

Meanwhile, in the case where there is no authority information stored after matching the storage location of the ID extracted from the authentication virtual code, when it is determined that the authentication virtual code is a normal code, the virtual code verifying device 200 may perform user authentication.

Besides, the virtual code verifying device 200 grants access authority through user authentication. When the virtual code verifying device 200 is a vehicle, the access authority may be vehicle internal access authority. When the vehicle internal access authority is granted, the vehicle unlocks the vehicle's door lock such that a user is capable of entering the inside of the vehicle.

In an embodiment, when the virtual code verifying device 200 is a door lock, the access authority may be building internal access authority. When the building internal access authority is granted, the door lock is unlocked such that the user is capable of entering the inside of the building.

In another embodiment, when the virtual code verifying device 200 is a mobile terminal, the access authority may be the use authority of the mobile terminal. When the use authority of the mobile terminal is granted, the mobile terminal unlocks a terminal lock such that a user is capable of employing built-in functions of the mobile terminal.

On the other hand, the virtual code verifying device 200 may grant access authority step by step. In an embodiment, when the virtual code verifying device 200 is a vehicle, the access authority to the vehicle may include internal vehicle access authority, vehicle starting authority, and vehicle driving authority. The vehicle starting authority may start a vehicle and may use devices provided in the vehicle. However, when only the authority incapable of driving the vehicle is granted, the vehicle does not move. Moreover, the vehicle driving authority refers to authority capable of using all functions of the vehicle including driving the vehicle. The user may selectively grant the above-mentioned kind of authority to another person.

In another embodiment, when the virtual code receiving device 200 is a mobile terminal, the access authority may be granted for each application provided in the mobile terminal. For example, the user may grant only the access authority to a camera application provided in the mobile terminal to others.

A user authentication method using an authentication virtual code according to an embodiment of the inventive concept may be implemented by a program (or an application) and may be stored in a medium such that the program is executed in combination with a computer being hardware.

The above-described program may include a code encoded by using a computer language such as C, C++, JAVA, Ruby, a machine language, or the like, which a processor (CPU) of the computer may read through the device interface of the computer, such that the computer reads the program and performs the methods implemented with the program. The code may include a functional code related to a function that defines necessary functions executing the method, and the functions may include an execution procedure related control code necessary for the processor of the computer to execute the functions in its procedures. Furthermore, the code may further include a memory reference related code on which location (address) of an internal or external memory of the computer should be referenced by the media or additional information necessary for the processor of the computer to execute the functions. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted/received during communication by using a communication module of the computer.

The stored medium refers not to a medium, such as a register, a cache, or a memory, which stores data for a short time but to a medium that stores data semi-permanently and is read by a device. Specifically, for example, the stored media include, but are not limited to, ROM, RAM, CD-ROM, magnetic tape, floppy disk, optical data storage device, and the like. That is, the program may be stored in various recording media on various servers, which the computer may access, or in various recording media on the computer of the user. Further, the media may be distributed in computer systems connected over a network such that codes readable by the computer are stored in a distributed manner.

Although embodiments of the inventive concept have been described herein with reference to accompanying drawings, it should be understood by those skilled in the art that the inventive concept may be embodied in other specific forms without departing from the spirit or essential features thereof. Therefore, the above-described embodiments are exemplary in all aspects, and should be construed not to be restrictive.

According to an embodiment of the inventive concept, a user authentication method using an authentication virtual code and the effect provided by a system therefor will be described as follows.

First, it is possible to allow others to perform user authentication without contacting others by providing others with an authentication virtual code for temporarily performing user authentication.

Second, it is possible to allow others to perform user authentication only at a specific time without delivering the authentication virtual code to another person precisely at the specific time, by limiting a period during which the authentication virtual code is capable of being used.

Third, it is possible to allow a user to selectively grant necessary authority to others, by limiting the types of authorities capable of being granted to others through an authentication virtual code.

Fourth, as a redundant authentication virtual code does not appear within the specified period because a new authentication virtual code is generated for each unit count, or as an order of the generated authentication virtual codes for extracting user information in an authentication virtual code verifying device is randomized, user information is not leaked even when the authentication virtual code is leaked.

Fifth, an authentication virtual code generating function may be stored in an authentication virtual code generating device (e.g., a user terminal) that generates an authentication virtual code. An algorithm for extracting user information by using the authentication virtual code and verifying the authentication virtual code may be included in the authentication virtual code verifying device (e.g., a server, or the like) that determines whether the authentication virtual code is a normal code. Accordingly, the algorithm for generating and verifying the authentication virtual code may be prevented from being leaked.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A user authentication method by using an authentication virtual code, the method comprising:
    transmitting, by a virtual code generating device, time frame information to a virtual code verifying device,
    wherein the time frame information indicates time frames configured to allow user authentications, the time frames include different time frames assigned to different users, a respective identification code corresponds to a particular time frame among the time frames, and the respective identification code comprises a user identification (UID) or a sub-identification (SID);
    storing, by the virtual code verifying device, the time frame information;
    receiving, by the virtual code verifying device, the authentication virtual code, wherein the authentication virtual code is generated by an authentication virtual code generating function included in the virtual code generating device that is registered in the virtual code verifying device;
    searching, by the virtual code verifying device, for a storage location of the identification code, which corresponds to the received authentication virtual code;
    obtaining, by the virtual code verifying device, the identification from the searched storage location;
    extracting, by the virtual code verifying device, authority information that corresponds to the obtained identification code, from the virtual code verifying device;
    extracting, by the virtual code verifying device, the time frame information from the virtual code verifying device;
    identifying, by the virtual code verifying device, a particular time frame corresponding to the obtained identification code;
    verifying, by the virtual code verifying device, the authentication virtual code, wherein the virtual code verifying device verifies the authentication virtual code only when a time point at which the authentication virtual code is received is within the particular time frame corresponding to the identification code; and
    performing, after the authentication virtual code is verified, by the virtual code verifying device, the user authentication based on the extracted authority information.

2. The method of claim 1, wherein the receiving comprises:
    generating, by the virtual code generating device, the authentication virtual code;
    transmitting, by the virtual code generating device, the generated authentication virtual code to a virtual code receiving device; and
    receiving, by the virtual code verifying device, the authentication virtual code from the virtual code receiving device.

3. The method of claim 1, wherein the verifying comprises:
    when another time point at which the authentication virtual code is generated is included in an error range from the time point at which the authentication virtual code is received, determining, by the virtual code verifying device, that the authentication virtual code is verified.

4. The method of claim 3, wherein the verifying further comprises:
    in a state where the time frame information corresponding to the identification code is stored in the storage location of the identification code, when the time point at which the authentication virtual code is received belongs to a time zone corresponding to the time frame information, determining, by the virtual code verifying device, that the authentication virtual code is verified.

5. The method of claim 1, wherein the performing comprises:
extracting, by the virtual code verifying device, the identification code from the authentication virtual code; and
when the authentication virtual code is the verified, performing the user authentication regardless of the authority information that corresponds to the extracted identification code and is stored in the storage location of the extracted identification code.

6. The method of claim 2, further comprising:
before receiving the authentication virtual code, transmitting, by the virtual code generating device, a type of access authority corresponding to the identification code, to the virtual code verifying device; and
storing, by the virtual code verifying device, the received type of the access authority with the identification code.

7. The method of claim 6, wherein the performing comprises:
extracting, by the virtual code verifying device, the type of the access authority corresponding to the identification code and stored in the storage location of the identification code-UID or the SID, and
wherein the virtual code verifying device performs the user authentication corresponding to the type of the access authority by using the authentication virtual code.

8. A non-transitory computer readable storage medium, coupled with a hardware processor, and storing a user authentication program by using an authentication virtual code, to perform the method of claim 1.

9. An authentication virtual code generating device for a user authentication, comprising:
a detailed code generating unit configured to generate one or more detailed codes based on an identification code, which comprises a user identification (UID) or a sub-identification (SID), and is registered in the virtual code generating device;
a virtual code generating unit configured to generate an authentication virtual code obtained by combining the one or more detailed codes, by using an authentication virtual code generating function; and
an authentication virtual code providing unit configured to:
transmit time frame information to a virtual code verifying device, wherein the time frame information indicates time frames configured to allow user authentications, the time frames include different time frames assigned to different users, and a respective identification code corresponds to a particular time frame among the time frames;
transmit the generated authentication virtual code to a virtual code receiving device so as to perform the user authentication on the virtual code verifying device, through the virtual code receiving device, wherein the authentication virtual code is verified only when a time point at which the authentication virtual code is received at the virtual code verifying device is within the particular time frame corresponding to the identification code.

10. An authentication virtual code verifying device for a user authentication comprising:
a virtual code receiving unit configured to receive an authentication virtual code;
a detailed code extracting unit configured to extract a detailed code from the authentication virtual code;
a storage location search unit configured to search for a storage location of an identification code, which comprises a user identification (UID) or a sub-identification (SID), based on the detailed code;
an authority information extracting unit configured to extract authority information corresponding to the identification code and stored in the authentication virtual code verifying device;
a virtual code verifying unit configured to:
receive time frame information from a virtual code generating device, wherein the time frame information indicates time frames configured to allow user authentications, the time frames include different time frames assigned to different users, and a respective identification code corresponds to a particular time frame among the time frames;
storing the time frame information;
extract the time frame information corresponding to the identification code and stored in the virtual code verifying device;
verify the authentication virtual code, wherein the authentication virtual code is verified only when a time point at which the authentication virtual code is received at authentication virtual code verifying device is within the particular time frame corresponding to the identification code; and
a user authentication approving unit configured to perform the user authentication based on the extracted authority information, after the authentication virtual code is verified.

11. The authentication virtual code verifying device of claim 10, wherein the authentication virtual code verifying device includes a vehicle or a door lock.

12. The authentication virtual code verifying device of claim 11, wherein, when the authentication virtual code verifying device is the vehicle, the authentication virtual code verifying device receives the identification code and a type of access authority corresponding to the identification code, from a virtual code generating device, and stores the type of the access authority with the identification code, and
wherein the type of the access authority includes in-vehicle access authority, vehicle starting authority, and vehicle driving authority.

13. The authentication virtual code verifying device of claim 12, wherein the user authentication approving unit extracts the type of the access authority corresponding to the identification code, and performs the user authentication by granting one of the in-vehicle access authority, the vehicle starting authority, and the vehicle driving authority depending on the extracted type of the access authority.

* * * * *